Aug. 7, 1923.

R. MARX

FURNACE

Filed Oct. 7, 1918

1,464,210

Witness
Chas. W. Stauffer
Karl H. Butler

Inventor
Richard Marx,
By
Attorneys

Patented Aug. 7, 1923.

1,464,210

UNITED STATES PATENT OFFICE.

RICHARD MARX, OF DETROIT, MICHIGAN.

FURNACE.

Application filed October 7, 1918. Serial No. 257,122.

*To all whom it may concern:*

Be it known that I, RICHARD MARX, a citizen of the United States of America, residing at Detroit, in the county of Wayne and State of Michigan, have invented certain new and useful Improvements in Furnaces, of which the following is a specification, reference being had therein to the accompanying drawings.

In my Patent No. 1,178,662, granted April 11, 1916, there are disclosed novel baffle members for baffling and retarding products of combustion, hot air and heated gases, so that heating units may be derived from the products of combustion before their final escape to the exhaust flue or chimney. The baffle members in this patent are shown as providing a sinuous or tortuous path in a radiating drum adapted to be installed in a flue or chimney and I have found that similar baffling members can be advantageously used in a furnace, particularly the combustion chamber thereof, and by which the efficiency of the furnace may be materially increased as a heating device.

Reference will now be had to the drawing, wherein—

Figure 1:
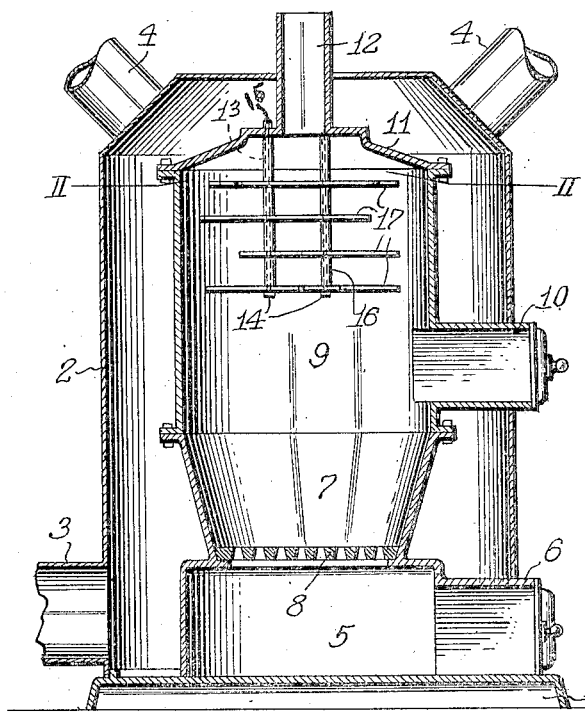
Figure 1 is a vertical sectional view of a furnace provided with baffle members in accordance with my invention.
Figure 3:
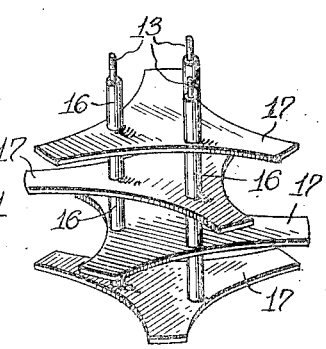
Fig. 3 is a perspective view of a plurality of assembled baffle members.
Figure 2:
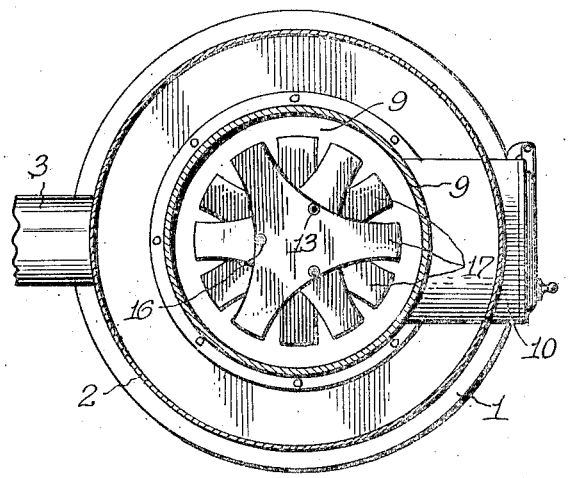
Fig. 2 is a horizontal sectional view of the furnace taken on the line 11—11 of Fig. 1.

There has been illustrated a conventional form of furnace or heating apparatus as including a base 1 having an outer casing or shell 2 provided with a cold air inlet duct or flue 3 and hot air distributing ducts or flues 4. In the casing 2 and on the base 1 is an ash chamber 5 having a doorway 6, and above the ash chamber and communicating therewith is a fire box or pot 7 with grate 8 in the bottom thereof. On the fire pot or box 7 is a combustion chamber 9 provided with a doorway 10, and on top of the combustion chamber 9 is a cover 11 provided with a central smoke flue or chimney 12.

My invention resides in providing the cover 11 with a plurality of depending tie rods 13 having the lower ends thereof provided with heads 14 and the upper ends screwthreaded to receive nuts 15, said nuts constituting suitable means for holding the suspension rods in engagement with the cover 11 and centrally of the combustion chamber 9.

On the suspension rods 13 are spacing sleeves or members 16, and these spacing sleeves or members cooperate with the heads 14 of the rods 13 in holding a plurality of baffle members 17 spaced apart and in staggered relation relative to one another. Each baffle member is substantially triangular in plan and the arms of said baffle members extend in proximity to the inner walls of the combustion chamber 9. With the baffle members staggered a sinuous or tortuous passage is formed in the upper part of the combustion chamber 9, and it is in consequence of this suspended structure that the products of combustion will be retarded in the upper part of the combustion chamber 9 before final escape in the flue or chimney 12. It is therefore possible for the products of combustion to thoroughly heat the walls of the combustion chamber 9 and the air circulating between said combustion chamber and the outer casing 2. Furthermore by retarding the products of combustion, it is possible to have ordinary waste products consumed and reduce the accumulation of soot and the amount of smoke from the furnace.

What I claim is:—

The combination of a combustion chamber, a cover therefor, a flue carried by said cover axially thereof and communicating with said combustion chamber, tie rods suspended from said cover and having the upper ends thereof connected to said cover as close to the axis of said chamber as said flue will permit, staggeredly arranged baffle members on said tie rods below said flue, said baffle members having short peripheral edges and long concave edges, said baffle members being disposed in parallel planes with the short edges thereof in proximity to walls of the combustion chamber, said tie rods extending through said baffle members at the long concave edges of said baffle members and equidistant from the short peripheral edges thereof, and sleeves on said tie rods between said baffle members and between said cover and the uppermost baffle member maintaining said members in spaced superposed relation, said baffle members cooperating with walls of said chamber in providing an uninterrupted annular passage at the walls of said chamber, and said baffle members cooperating with one another in forming a sinuous passage within a zone defined by the peripheral edges of said baffle members.

In testimony whereof I affix my signature in the presence of two witnesses.

RICHARD MARX.

Witnesses:
 ARTHUR C. MARX,
 KARL H. BUTLER.